L. LUSARDI.
GUY ANCHOR.
APPLICATION FILED AUG. 17, 1914.

1,225,448.

Patented May 8, 1917.

Witnesses

Inventor
L. Lusardi.
By
Attorneys

UNITED STATES PATENT OFFICE.

LUCY LUSARDI, OF DEFIANCE, MICHIGAN.

GUY-ANCHOR.

1,225,448. Specification of Letters Patent. Patented May 8, 1917.

Application filed August 17, 1914. Serial No. 857,169.

*To all whom it may concern:*

Be it known that I, LUCY LUSARDI, a citizen of the United States, residing at Defiance, in the county of Delta, State of Michigan, have invented certain new and useful Improvements in Guy-Anchors; and I do hereby declare the following to be a full, clear, and exact description of the invention, such as will enable others skilled in the art to which it appertains to make and use the same.

This invention relates to improvements in anchoring devices, and particularly to anchoring devices for the guy ropes of tents.

The principal object of the invention is to provide a simple novel and cheap device of this character which can be quickly and easily driven into the ground and which will effectively hold the guy rope under great strain.

Other objects and advantages will be apparent from the following description, when taken in connection with the accompanying drawings.

Figure 1:
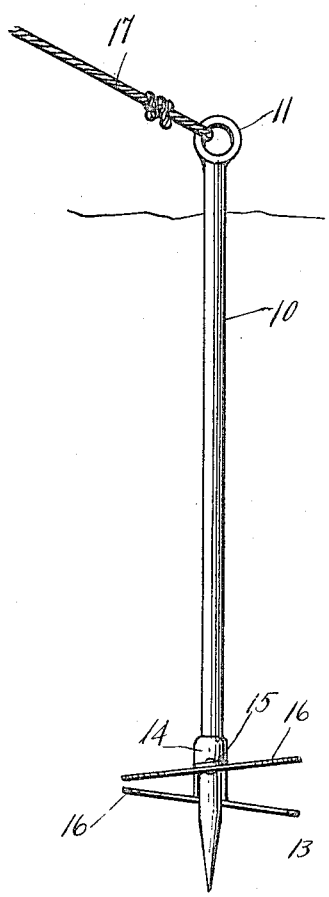
Figure 1 is an elevation of the device in operative position.
Figure 2:
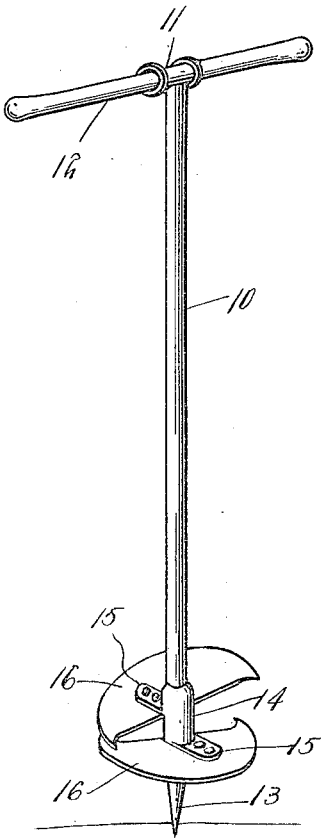
Fig. 2 is a perspective view of the device as it appears when ready to be driven into the ground.

Referring particularly to the accompanying drawings, 10 represents a rod or stem of suitable length, the upper end of which is provided with a member 11 having a transverse opening therethrough for the reception of the handle bar 12 by means of which the stem may be rotated. The lower end of the stem is provided with a sharp point 13 which is adapted to be used to start the device in the ground. Secured to the stem above the point is a sleeve 14 which is provided with the opposite extending ears 15 to which are secured the plates 16. These plates are curved and inclined in opposite directions in the manner of an auger.

By placing the handle bar 12 through the opening of the member 11, and forcing the point of the stem in the ground, the stem can be rotated so as to cause the auger plates to advance into the ground. The handle bar is then removed and the guy rope 17 of the tent secured within the member 11. The device will thus be held firmly in the ground and will resist great strain.

What is claimed is:

A guy rope anchor comprising a stem provided with rope attaching means and pointed at one end, a sleeve fixed in said stem adjacent the point and having oppositely extending ears placed in a staggered relation to each other, said ears being inclined in opposite direction transversely of their minor dimensions, auger blades secured to said ears and inclined in the same direction of the ears, said blades being formed of semi-circular disks and being pointed at the junction of the curved and straight lines.

In testimony whereof, I affix my signature, in the presence of two witnesses.

LUCY LUSARDI.

Witnesses:
DAVE LUSARDI,
NETTIE SMEARS.

Copies of this patent may be obtained for five cents each, by addressing the "Commissioner of Patents, Washington, D. C."